(12) United States Patent
Dickey et al.

(10) Patent No.: US 12,113,288 B2
(45) Date of Patent: Oct. 8, 2024

(54) ANTENNA ARRAY WITH SELECTABLE HORIZONTAL, VERTICAL OR CIRCULAR POLARIZATION

(71) Applicant: Silicon Laboratories Inc., Austin, TX (US)

(72) Inventors: Terry Lee Dickey, Pflugerville, TX (US); Attila Zólomy, Budapest (HU); Adám Süle, Budapest (HU); Sauli Lehtimaki, Nummela (FI); Szabolcs Lörincz, Vamosmikola (HU)

(73) Assignee: Silicom Laboratories Inc., Austin, TX (US)

( * ) Notice: Subject to any disclaimer, the term of this patent is extended or adjusted under 35 U.S.C. 154(b) by 357 days.

(21) Appl. No.: 17/356,766

(22) Filed: Jun. 24, 2021

(65) Prior Publication Data
US 2022/0416445 A1    Dec. 29, 2022

(51) Int. Cl.
*H01Q 21/24* (2006.01)
*G01S 3/08* (2006.01)
*H01Q 15/24* (2006.01)

(52) U.S. Cl.
CPC .............. *H01Q 21/24* (2013.01); *G01S 3/08* (2013.01); *H01Q 15/244* (2013.01); *H01Q 15/246* (2013.01); *H01Q 21/245* (2013.01)

(58) Field of Classification Search
CPC ........ G01S 3/08; H01Q 21/24; H01Q 15/244; H01Q 15/246; H01Q 15/245
USPC .................................................... 342/147, 365
See application file for complete search history.

(56) References Cited

U.S. PATENT DOCUMENTS

| | | | |
|---|---|---|---|
| 2013/0088391 A1* | 4/2013 | Corman | H04B 7/18515 342/365 |
| 2020/0284883 A1* | 9/2020 | Ferreira | H04N 25/773 |
| 2021/0096207 A1* | 4/2021 | Torrini | G06N 3/045 |
| 2022/0291395 A1* | 9/2022 | Iyengar | H01Q 9/42 |
| 2022/0416440 A1 | 12/2022 | Süle et al. | |

\* cited by examiner

*Primary Examiner* — Bo Fan
(74) *Attorney, Agent, or Firm* — NIELDS, LEMACK & FRAME, LLC

(57) ABSTRACT

A system and method for selecting a polarization for a particular antenna in an antenna array is disclosed. The system comprises an antenna array, wherein each antenna is adapted to receive and transmit horizontally and vertically polarized signals. The system also includes a switching network that is adapted to select the vertical or horizontal polarized signal for each antenna in the antenna array. The switching network also allows selection of a circular polarized signal from one or more of the antenna elements in the antenna array. This allows the AoX to be more accurate, as it is able to receive horizontally and vertically polarized signals, rather than just circular polarized signals, thereby improving its accuracy. The ability to receive circular polarized signals may be beneficial during reference periods to acquire the proper gain and frequency.

20 Claims, 6 Drawing Sheets

| CIRCULAR | UPPER/LOWER | ANTENNA SELECT | RESULT |
|---|---|---|---|
| 0 | 0 | 0000 | ANTENNA #1 HORIZONTAL |
| 0 | 0 | 0001 | ANTENNA #1 VERTICAL |
| 0 | 0 | 0010 | ANTENNA #2 HORIZONTAL |
| 0 | 0 | 0011 | ANTENNA #2 VERTICAL |
| 0 | 0 | 0100 | ANTENNA #3 HORIZONTAL |
| 0 | 0 | 0101 | ANTENNA #3 VERTICAL |
| 0 | 0 | 0110 | ANTENNA #4 HORIZONTAL |
| 0 | 0 | 0111 | ANTENNA #4 VERTICAL |
| 0 | 0 | 1000 | ANTENNA #5 HORIZONTAL |
| 0 | 0 | 1001 | ANTENNA #5 VERTICAL |
| 0 | 0 | 1010 | ANTENNA #6 HORIZONTAL |
| 0 | 0 | 1011 | ANTENNA #14 HORIZONTAL |
| 0 | 0 | 1100 | ANTENNA #7 HORIZONTAL |
| 0 | 0 | 1101 | ANTENNA #7 VERTICAL |
| 0 | 0 | 1110 | ANTENNA #8 HORIZONTAL |
| 0 | 0 | 1111 | ANTENNA #8 VERTICAL |
| 0 | 1 | 0000 | ANTENNA #9 HORIZONTAL |
| 0 | 1 | 0001 | ANTENNA #9 VERTICAL |
| 0 | 1 | 0010 | ANTENNA #10 HORIZONTAL |
| 0 | 1 | 0011 | ANTENNA #10 VERTICAL |
| 0 | 1 | 0100 | ANTENNA #11 HORIZONTAL |
| 0 | 1 | 0101 | ANTENNA #11 VERTICAL |
| 0 | 1 | 0110 | ANTENNA #12 HORIZONTAL |
| 0 | 1 | 0111 | ANTENNA #12 VERTICAL |
| 0 | 1 | 1000 | ANTENNA #13 HORIZONTAL |
| 0 | 1 | 1001 | ANTENNA #13 VERTICAL |
| 0 | 1 | 1010 | ANTENNA #6 VERTICAL |
| 0 | 1 | 1011 | ANTENNA #14 VERTICAL |
| 0 | 1 | 1100 | ANTENNA #15 HORIZONTAL |
| 0 | 1 | 1101 | ANTENNA #15 VERTICAL |
| 0 | 1 | 1110 | ANTENNA #16 HORIZONTAL |
| 0 | 1 | 1111 | ANTENNA #16 VERTICAL |
| 1 | X | 1010 | ANTENNA #6 CIRCULAR |
| 1 | X | 1011 | ANTENNA #14 CIRCULAR |
| 1 | X | ALL OTHERS | NOT USED |

FIG. 5

ANTENNA ARRAY WITH SELECTABLE HORIZONTAL, VERTICAL OR CIRCULAR POLARIZATION

This disclosure describes systems and methods for selecting a particular polarization for an antenna in an antenna array.

BACKGROUND

Angle of Arrival and Angle of Departure algorithms, collectively referred to as AoX algorithms, typically operate by determining a phase difference between different antenna elements in an antenna array. This phase difference can be used to determine the angle from which the signal originated, since the distance between antenna elements is known.

Specifically, assume the distance between two adjacent antenna elements is d. The phase difference between when the incoming signal is detected at these two adjacent antenna elements can be given as $\varphi$. This phase difference, $\varphi$, divided by $2\pi$, multiplied by the wavelength, $\lambda$, represents the distance between the two antenna elements, as viewed from the signal source. Knowing this difference in the distance that the incoming signal travelled allows the angle of arrival to be calculated. Specifically, the angle of arrival can be given by the difference in the distance that the incoming signal travelled, divided by d represents the cosine of the incoming signal. In other words, the angle of arrival is defined as the arc cosine of $(\varphi\lambda/2\pi)/d$.

One algorithm that is commonly used to determine AoX is referred to as MUSIC. This algorithm generates pseudospectrums from the incoming data and estimates the most likely AoX from these pseudospectrums. Many antenna arrays utilize circular polarization during the AoX algorithm. However, this approach may result in larger than desired errors, especially in multipath environments.

Therefore, it would be beneficial if there were a system and method of determining an AoX that was more accurate than existing antenna arrays by using a dual polarized reception method. Furthermore, it would be advantageous to use circular polarized detection at the reference period of the packet for more accurate receiver gain adjustments. Further, it would be advantageous if this system did not require any additional antenna elements to achieve this result.

SUMMARY

A system and method for selecting a polarization for a particular antenna element in an antenna array is disclosed. The system comprises an antenna array, wherein each antenna element is adapted to receive and transmit horizontally and vertically polarized signals. The system also includes a switching network that is adapted to select the vertical or horizontal polarized signal for each antenna element in the antenna array. The switching network also allows selection of a circular polarized signal from one or more of the antenna elements in the antenna array. This allows the AoX to be more accurate, as it is able to receive horizontally and vertically polarized signals, rather than just circular polarized signals, thereby improving its accuracy. The ability to receive circular polarized signals may be beneficial during reference periods to acquire the proper gain and frequency.

According to one embodiment, a wireless network device is disclosed. The wireless network device comprises an antenna array, comprising a plurality of antenna elements; a wireless network interface, wherein the wireless network interface receives an incoming signal from one of the antenna elements in the antenna array; a processing unit; and a switching network disposed between the antenna array and the wireless network interface to select an antenna element from the antenna array, wherein the switching network is configured to couple a horizontal polarized signal or a vertical polarized signal from any of the plurality of antenna elements to the wireless network interface and is also configured to couple a circular polarized signal from at least one of the antenna elements to the wireless network interface. In some embodiments, the wireless network device receives a signal comprising a constant tone extension (CTE) with a plurality of switching slots and sample slots. In certain embodiments, the processing unit comprises a plurality of output signals in communication with the switching network; and wherein the processing unit selects one of the plurality of antenna elements during each switching slot by modifying the plurality of output signals. In some embodiments, the CTE further comprises a guard period and a reference period, and wherein the processing unit modifies the plurality of output signals so as to receive the circular polarized signal during at least a portion of the guard period and/or the reference period. In certain embodiments, the wireless network interface comprises a programmable gain amplifier (PGA) and the processing unit sets a gain of the PGA based on an amplitude of the circular polarized signal received during the at least a portion of the guard period and/or the reference period. In certain embodiments, the wireless network interface comprises a low noise amplifier (LNA) and the processing unit sets a gain of the LNA based on an amplitude of the circular polarized signal received during the reference period. In some embodiments, the antenna array comprises a N×M array wherein N and M are greater than one, and an antenna element disposed along an outer edge of the N×M array is used to provide the circular polarized signal. In some embodiments, the antenna array comprises a N×M array wherein N and M are greater than one, and an inner antenna element is used to provide the circular polarized signal.

According to another embodiment, switching network in communication with an antenna array, wherein each antenna element in the antenna array comprises a horizontal polarized signal and a vertical polarized signal, is disclosed. The switching network comprises an upper antenna selection switch and a lower antenna selection switch, each having a multiplexed signal and a plurality of demultiplexed signals, wherein the horizontal polarized signal and the vertical polarized signal of each antenna element is in communication with a demultiplexed signal on one of the upper and the lower antenna selection switches; and wherein the vertical polarized signal and the horizontal polarized signal of at least one antenna element are in communication with demultiplexed signals on different antenna selection switches, wherein control signals, referred to as ANTENNA SELECT, are used to select one of the demultiplexed signals to be in communication with the multiplexed signal; an upper polarization switch having a multiplexed signal in communication with the multiplexed signal from the upper antenna selection switch, and having a first and a second demultiplexed signal, wherein a control signal, referred to as CIRCULAR, is used to select one of the demultiplexed signals to be in communication with the multiplexed signal; a lower polarization switch having a multiplexed signal in communication with the multiplexed signal from the lower antenna selection switch, and having a first and a second demultiplexed signal, wherein a control signal, referred to as CIRCULAR, is used to select one of the demultiplexed signals to be in communication with the multiplexed signal; a 90° hybrid in communication with the second demultiplexed signal from the upper polarization switch and the second demultiplexed signal from the lower polarization switch; a bank selection switch having a multiplexed signal, a first demultiplexed signal in communication with the first demultiplexed signal from the upper polarization switch, and a second demultiplexed signal in communication with the first demultiplexed signal from the lower polarization switch, wherein a control signal, referred to as UPPER/LOWER, is used to select one of the demultiplexed signals to be in communication with the multiplexed signal; and a main polarization switch having a multiplexed signal, a first demultiplexed signal in communication with the multiplexed signal from the bank selection switch and a second demultiplexed signal in communication with the 90° hybrid, wherein a control signal, referred to as CIRCULAR, is used to select one of the demultiplexed signals to be in communication with the multiplexed signal. In some embodiments, the vertical polarized signal and the horizontal polarized signal of at least two antenna elements are in communication with demultiplexed signals on different antenna selection switches. In certain embodiments, the upper antenna selection switch and the lower antenna selection switch each comprise 16 demultiplexed signals, and wherein the antenna array comprises 16 antenna elements. In some embodiments, the switching network comprises a third antenna selection switch and fourth antenna selection switch; and wherein the bank selection switch comprises a third demultiplexed signal in communication with a multiplexed signal from the third antenna selection switch; a fourth demultiplexed signal in communication with a multiplexed signal from the fourth antenna selection switch; and an additional control signal to select among the four demultiplexed signals. In some embodiments, the antenna array comprises a N×M array wherein N and M are greater than one, and wherein one of the at least one antenna elements is an inner antenna element. In some embodiments, the antenna array comprises a N×M array wherein N and M are greater than one, and wherein one of the at least one antenna elements is disposed along an outer edge of the antenna array. In certain embodiments, the switching network is adapted to transmit signals to the antenna array or receive signals from the antenna array.

According to another embodiment, a method of calculating an angle of arrival is disclosed. The method comprises receiving, at a wireless network device, a signal comprising a constant tone extension, having a guard period, a reference period, and a plurality of switching slots and sample slots, wherein the wireless network device comprises an antenna array comprising a plurality of antenna elements and a switching network to select among signals from the antenna array; configuring the switching network so as to receive a circular polarized signal from one of the plurality of antenna elements; receiving the circular polarized signal during at least a portion of the guard period and/or reference period; configuring the switching network so as to receive a horizontal polarized signal from a first of the plurality of antenna elements during a switching slot; receiving the horizontal polarized signal from the first of the plurality of antenna elements during a sample slot; configuring the switching network so as to receive a vertical polarized signal from the first of the plurality of antenna elements during a switching slot; receiving the vertical polarized signal from the first of the plurality of antenna elements during a sample slot; repeating the configuring and receiving so as to receive vertical polarized signals and horizontal polarized signals from all of the antenna elements in the antenna array; using information from the horizontal polarized signals and the vertical polarized signals to calculate an angle of arrival. In some embodiments, the method comprises using information from the circular polarized signal to set a gain of a programmable gain amplifier (PGA). In certain embodiments, the method comprises using information from the circular polarized signal to set a gain of a low noise amplifier (LNA). In some embodiments, the antenna array comprises a N×M array wherein N and M are greater than one, and the circular polarized signal is received from an inner antenna element. In certain embodiments, the antenna array comprises a N×M array wherein N and M are greater than one, and the circular polarized signal is received from an antenna element disposed along an outer edge of the antenna array.

BRIEF DESCRIPTION OF THE DRAWINGS

For a better understanding of the present disclosure, reference is made to the accompanying drawings, in which like elements are referenced with like numerals, and in which:

FIG. 5 shows the various outputs that may be achieved using the switching network of FIG. 4.

DETAILED DESCRIPTION

Figure 1:
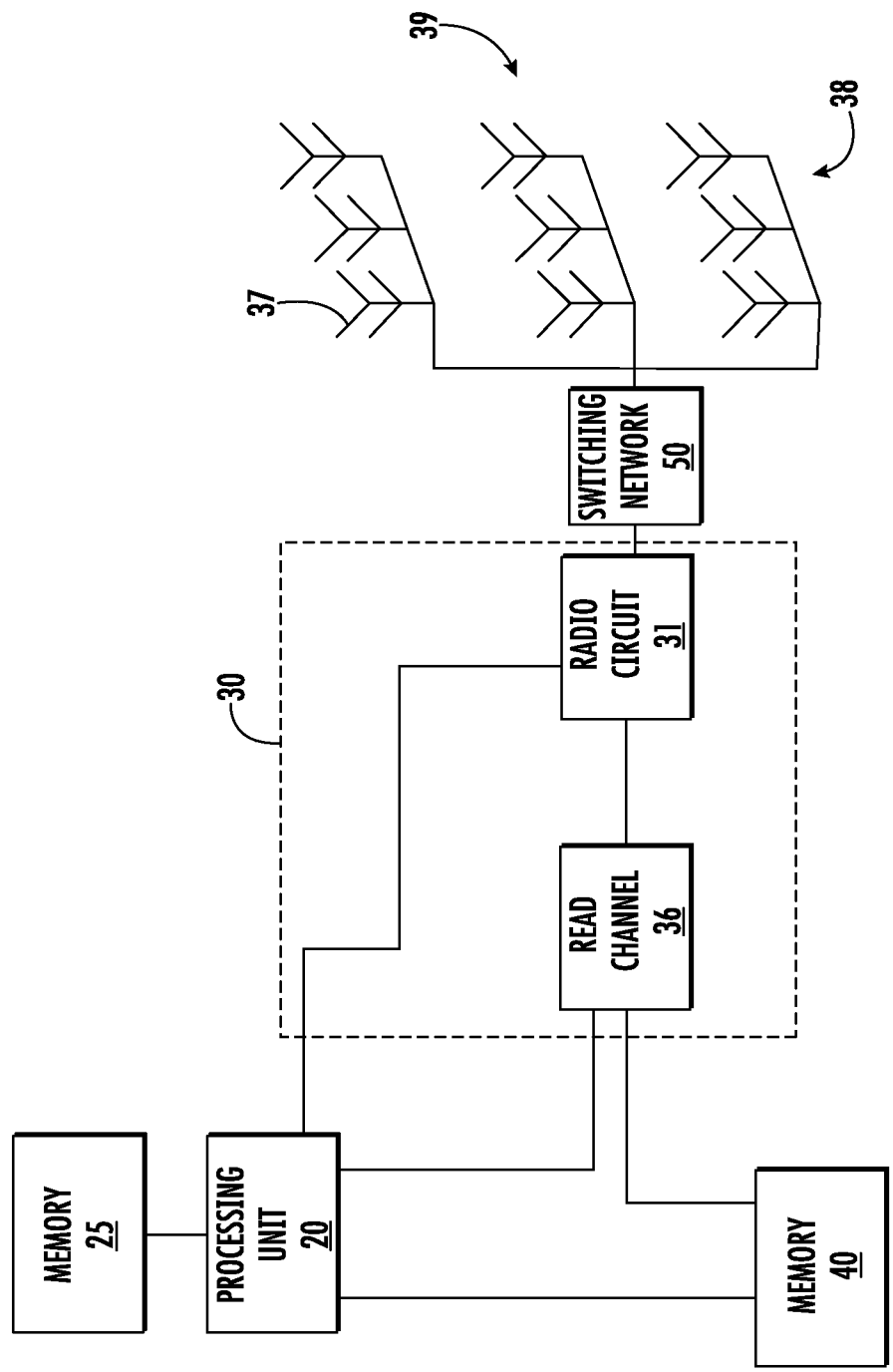
FIG. 1 is a block diagram of a network device that may be used to perform the method described herein.

FIG. 1 shows a network device that may be used to perform the AoX algorithm described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna array 38. The network interface 30 may support any wireless network protocol that supports AoX determination, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a read channel 36. The read channel 36 is used to receive, synchronize and decode the digital signals received from the radio circuit 31. Specifically, the read channel 36 has a preamble detector that is used to identify the start of an incoming packet. The read channel 36 also has a sync detector, which is used to identify a particular sequence of bits that are referred to as a sync character. Additionally, the read channel 36 has a decoder which is used to convert the digital signals into properly aligned bytes of data.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Figure 2:
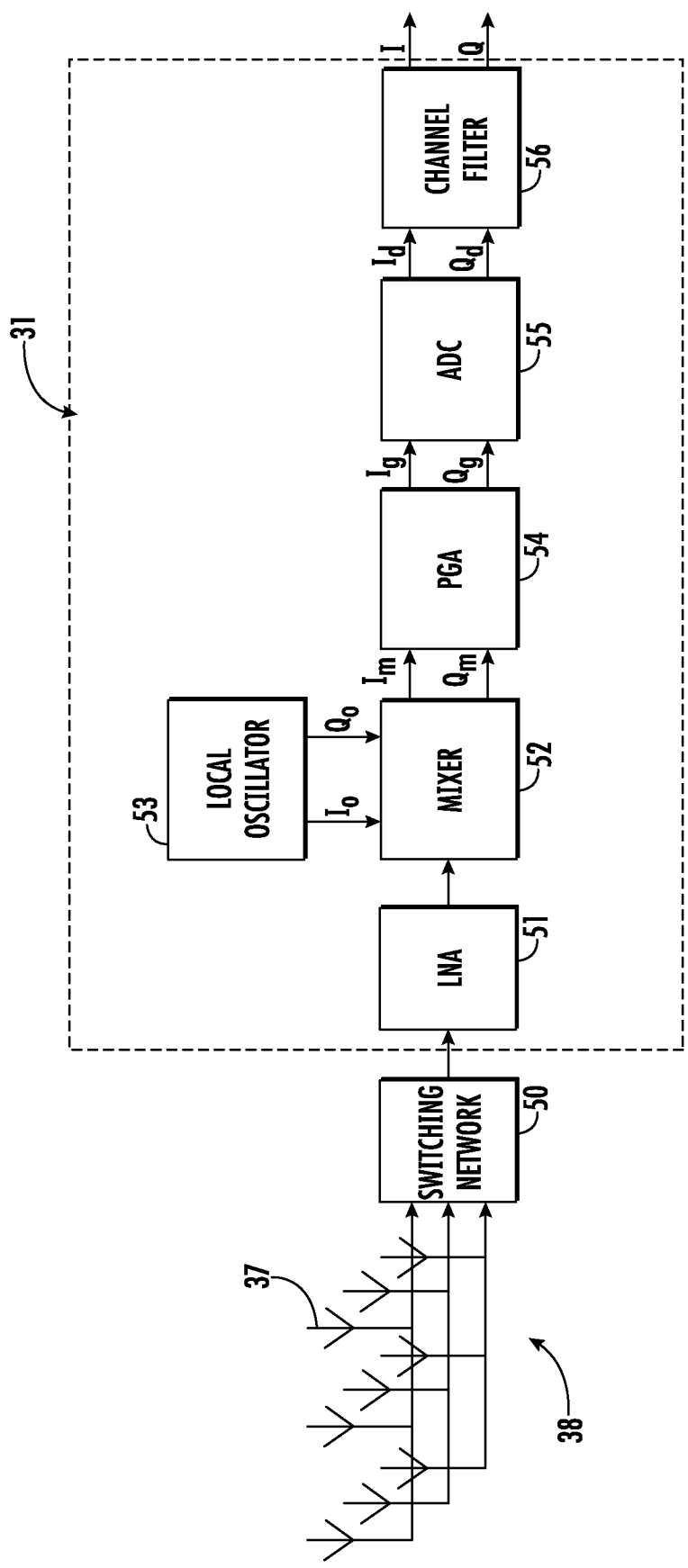
FIG. 2 is a block diagram of the radio receiver of the network device of FIG. 1.

FIG. 2 shows a block diagram of the radio circuit 31. The wireless signals first enter the radio circuit 31 through one antenna element 37 of the antenna array 38. A switching network 50 may be used to select one antenna element 37 from the antenna array 38. Once selected, this antenna element 37 is in electrical communication with a low noise amplifier (LNA) 51. The LNA 51 receives a very weak signal from the antenna element 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30.

Figure 3A:
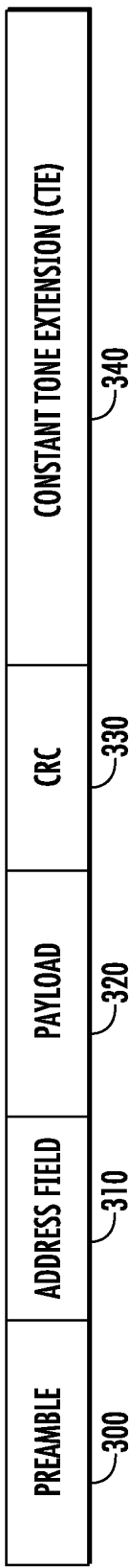
FIG. 3A-3C shows the format of a representative direction detection message transmitted to the system of FIG. 1.
Figure 3B:
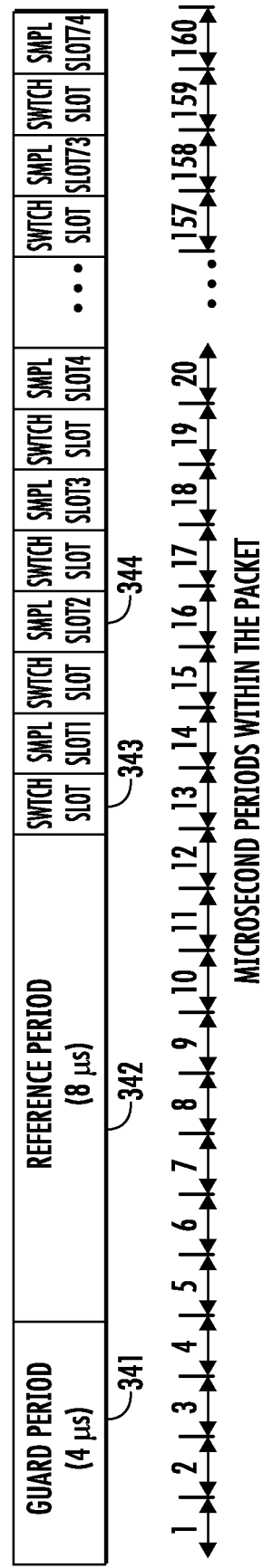
Figure 3C:
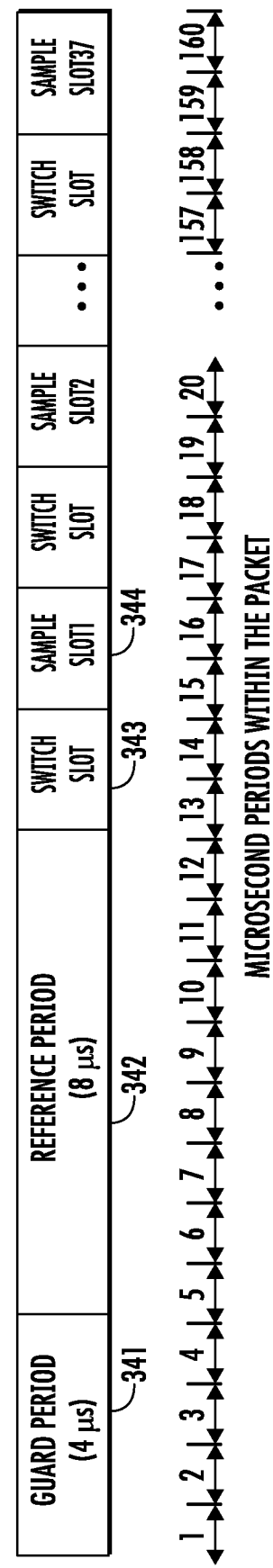

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"'s. The CTE 340 may be as long as 160 μsec and as short as 16 μsec. In practice, the network device 10 may use a single antenna element 37 of the antenna array 38 to receive the CTE 340 during the guard period 341 and the reference period 342. The device utilizes the signal received during the guard period 341 and the reference period 342 to set the gain (AGC) and frequency (AFC) of the radio circuit 31. The gain and frequency determinations by the radio circuit 31 may be more accurate if a circularly polarized signal from the antenna element 37 is used during the guard period 341 and the reference period 342.

The network device 10 then switches to another antenna element 37 during each switch slot 343 by changing the selection of the switching network 50 in the radio circuit 31. The network device 10 samples the tone again with that new antenna element 37 during the sample slot 344. The network device 10 continues switching the antenna element 37 during each switch slot 343 and sampling the tone during the sample slot 344. If there are more switch slots 343 than antenna elements, the network device 10 returns to the first antenna element 37 and repeats the sequence.

During the entirety of the CTE 340, the sending device is transmitting a tone at a constant known frequency. As stated above, the network device 10 may receive that tone using one antenna element 37 of the antenna array 38. Specifically, the guard period 341 and the reference period 342, which have a combined duration of 12 μsec, may be received using the same antenna element 37.

Importantly, it has been found that the accuracy of AoX algorithms is improved when the radio circuit 31 utilizes the horizontal and vertical polarized signals from each antenna element 37. Thus, the radio circuit 31 selects each antenna element during at least two different sample slots 344; one to receive the horizontally polarized signal, and one to receive the vertically polarized signal.

Thus, in summary, to optimize the accuracy of the AoX algorithm, it may be beneficial to utilize a circularly polarization signal from one antenna element 37 during the guard period 341 and the reference period 342. It may also be beneficial to sample each antenna element 37 at least twice during the sample slots 344, such that the horizontally polarized and vertically polarized signals from each antenna element are used as part of the AoX algorithm.

Figure 4:
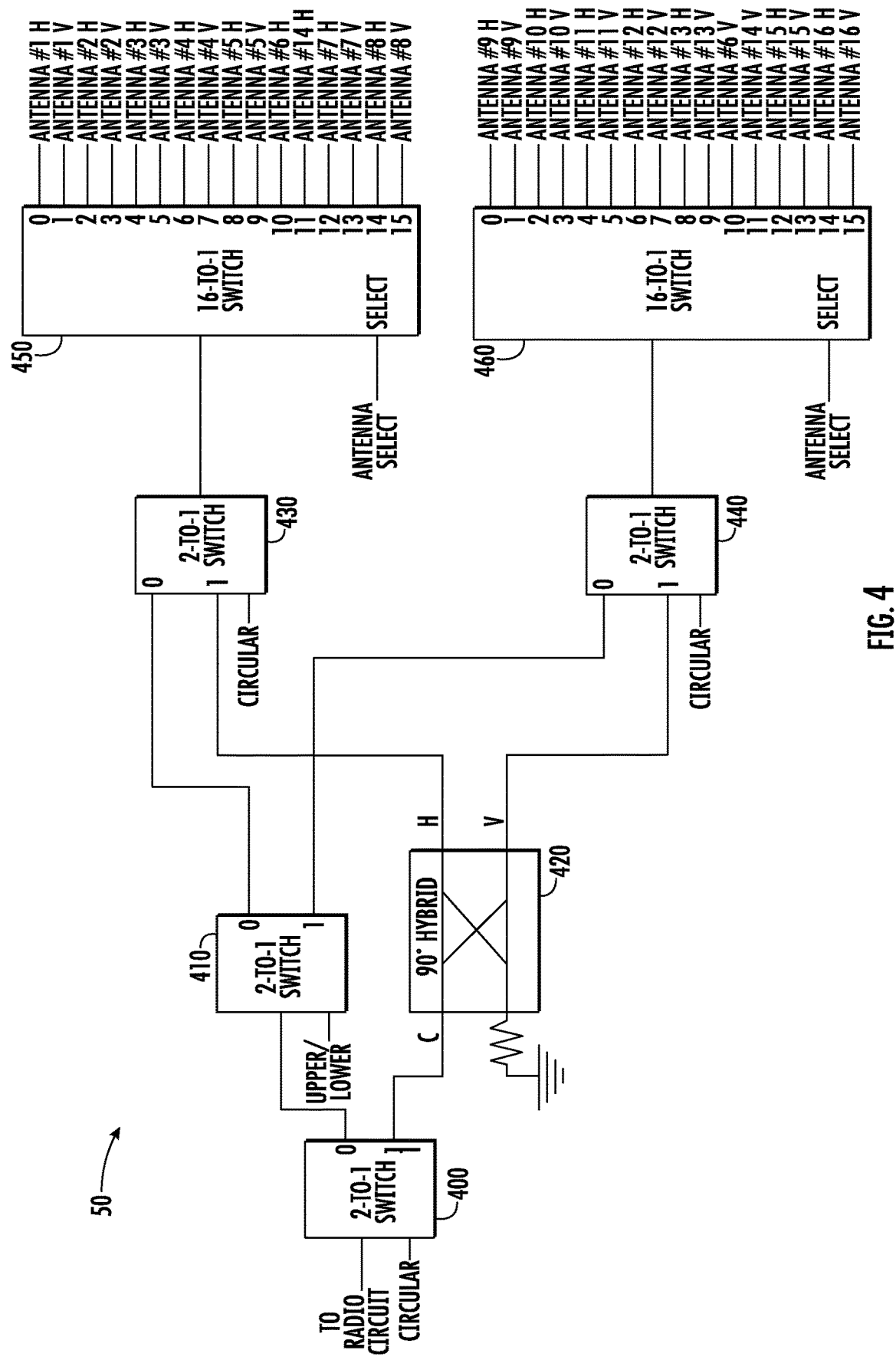
FIG. 4 shows a block diagram of the switching network according to one embodiment.

This complex switching operation may be performed by the switching network 50. FIG. 4 shows a representative block diagram of the switching network 50. In this figure, it is assumed that there are 16 antenna elements 37, each configured to transmit and receive both horizontal and vertical polarized signals. In other words, the switching network is adapted to receive a signal from one of the antenna elements, or to transmit a signal to one of the antenna elements.

An upper antenna selection switch 450 is used to select one of 16 antenna signals. In certain embodiments, the signals used for the upper antenna selection switch 450 may be based on printed circuit board routing considerations. For example, if the antenna array is arranged as a 4×4 array, most of the signals in communication with the upper antenna selection switch 450 may be from antenna elements disposed in the top two rows of the antenna array 38. A lower antenna selection switch 460 is used to select one of 16 antenna signals. Again, the signals used for the lower antenna selection switch 460 may be based on printed circuit board routing considerations. For example, if the antenna array 38 is arranged as a 4×4 array, most of the signals in communication with the lower antenna selection switch 460 may be from antenna elements disposed in the bottom two rows of the antenna array 38.

Upper antenna selection switch 450 and lower antenna selection switch 460 may be bidirectional switches. Thus, these switches may be used to receive signals from the antenna elements 37 and also transmit signals to the antenna elements 37. Thus, the upper and lower antenna selection switches act as multiplexers and demultiplexers, depending on the direction of the activity. For clarity, the side of the switches with multiple interfaces will be referred to as the demultiplexed signals and the side of the switches with a single interface will be referred to as the multiplexed signal.

For most antenna elements, the horizontal and vertical polarized signals for each antenna element 37 may be in communication with the demultiplexed signals on same antenna selection switch (either upper antenna selection switch 450 or lower antenna selection switch 460). However, for at least one antenna element, the horizontal and vertical polarized signals are in communication with the demultiplexed signals on different switches. In this particular illustration, the vertical polarized signal from Antenna #6 is in communication with the demultiplexed signals on the lower antenna selection switch 460, while the horizontal polarized signal is in communication with the demultiplexed signals on the upper antenna selection switch 450. To accommodate this change, the horizontal polarized signal from Antenna #14 is in communication with the demultiplexed signals on the upper antenna selection switch 450. Note that the signals from Antenna #6 are in communication with the demultiplexed signal labelled 10 on both switches. Similarly, the signals from Antenna #14 are in communication with the demultiplexed signal labelled 11 on both switches.

The particular antenna signal that is selected by these antenna selection switches is determined based on the select signals. For example, four binary signals may be used to select one of the 16 demultiplexed signals on these switches. In certain embodiments, these select signals, referred to as ANTENNA SELECT, may be provided by the processing unit 20. For all of the switches described herein, the control signals are used to allow one of the demultiplexed signals to be in communication with the multiplexed signal.

Note that the upper antenna selection switch 450 and the lower antenna selection switch 460 have sixteen inputs to accommodate two signals from each antenna element 37 in the antenna array 38. If there are a different number of antenna elements 37 in the antenna array 38, the upper antenna selection switch 450 and lower antenna selection switch 460 may have a different number of inputs. For example, an antenna array arranged as a 4×2 array may utilize upper and lower antenna selection switches that had 8 inputs each.

The multiplexed signal from the upper antenna selection switch 450 is in communication with the multiplexed signal from the upper polarization switch 430. The upper polarization switch 430 is used to select between a circular polarized signal or a signal that is only polarized in one direction. Similarly, the multiplexed signal from the lower antenna selection switch 460 is in communication with the multiplexed signal from the lower polarization switch 440. The lower polarization switch 440 is used to select between a circular polarized signal or a signal that is only polarization in one direction. A signal, referred to as CIRCULAR, is used to select between these modes. This CIRCULAR signal may be provided by processing unit 20.

The demultiplexed signals from the upper and lower polarization switches are in communication with a 90° hybrid 420 and the bank selector switch 410, respectively.

The bank selector switch 410 is used to select between the upper polarization switch 430 and the lower polarization switch 440. In certain embodiments, a signal, referred to UPPER/LOWER is used to select between the two polarization switches. This UPPER/LOWER signal may be provided by the processing unit 20.

The 90° hybrid 420 is configured such that when horizontal and vertical polarized signals are presented at the two signals on the right side of the device, a circular polarized signal is produced on the left side. Similarly, if a circular polarized signal is presented on the left side of the device, a horizontal polarized signal and a vertical polarized signal are generated on the right side of the device.

The multiplexed signal from the bank selector switch 410 is in communication with a first demultiplexed signal from the main polarization switch 400. Additionally, the 90° hybrid 420 is in communication with a second demultiplexed signal from the main polarization switch 400. The main polarization switch 400 is also controlled by the CIRCULAR signal, described above.

Thus, in summary, the switching network utilizes six signals (the ANTENNA SELECT signals, the CIRCULAR signal and the UPPER/LOWER signal) to select between the vertical polarized signal of any of the 16 antenna elements, the horizontal polarized signal of any of the 16 antenna elements, and the circular polarized of at least one of the antenna elements. FIG. 5 illustrates the operation of the switching network 50.

Note that when CIRCULAR is set to zero, it is possible to select each of the 16 antenna elements in either horizontal or vertical polarization mode. Further, when CIRCULAR to set to 1, it is possible to select antenna #6 or antenna #14 in circular mode.

Thus, through the use of a single 90° hybrid and three additional switches (i.e. the main polarization switch 400, the upper polarization switch 430 and the lower polarization switch 440), it is possible to generate and receive at least one circular polarized signal from the antenna array 38. Further, note that the circular polarized signal is generated from one or more of the antenna elements 37 in the antenna array 38 and does not require an additional antenna, separate from the antenna array 38.

Additionally, each signal from an antenna element 37 is in communication with exactly one signal on either the upper antenna selection switch 450 or lower antenna selection switch 460. Therefore, it may be possible to match the lengths of each signal so that the phase delay associated with each antenna element is the same.

Note that FIG. 4 allows only antenna #6 and antenna #14 to be used for circular polarization. However, the disclosure is not limited to this embodiment. For example, if it was desired that four antenna elements needed to be operable in circular polarization mode, the vertical polarization of a third antenna element may be moved from the upper antenna selection switch 450 to the lower antenna selection switch 460 and replaced with the horizontal polarization of a fourth antenna element in the lower antenna selection switch 460 that is located in the same position as the horizontal polarization of the third antenna element. For example, if the vertical polarization of antenna #1 is moved to the lower antenna selection switch 460, the horizontal polarization of antenna #9 would be used to replace it. In one particular embodiment, the horizontal polarizations of all antenna elements are in communication with the upper antenna selection switch 450 and the vertical polarizations of all of the antenna elements are in communication with the corresponding demultiplexed signals on the lower antenna selection switch 460. However, in certain embodiments, the routing of the signals from the antenna array 38 may make this configuration difficult to achieve.

However, as noted above, in many embodiments, the guard period 341 and reference period 342 are typically received or transmitted using a single antenna element. Therefore, the ability to obtain circular polarization for two antenna elements in the antenna array 38, as shown in FIG. 4-5, is sufficient for this application.

In certain embodiments, the selection of which antenna elements are capable of circular polarization may be of interest. For example, in certain embodiments, in a 4×4 array, one of the four inner antenna elements may be preferable. In other embodiments, one of the four antenna elements located at the corners of the antenna array 38 may be preferred. By proper selection of which antenna element is connected to which signal of the upper antenna selection switch 450 and lower antenna selection switch 460, these configurations may be achieved. Thus, in certain embodiments, the antenna array may be a 4×4 array, and at least one of antenna #14 or antenna #6 may be an antenna element that is disposed along an outer edge of the array, such as along one of the outer sides or at one of the corners. In certain embodiments, at least one of antenna #14 or antenna #6 may be an antenna element that is one of the four inner antenna elements in the array. In another embodiment, one of antenna #14 or antenna #6 may be an antenna element that is disposed along an outer edge of the array and the other of antenna #14 and #6 may be an inner antenna element.

While the above disclosure describes an antenna array as a 4×4 array, any size antenna array may be utilized. For example, the antenna array may be a N×N array, where N is greater than 1. In other embodiments, the antenna array is not square and may be N×M where N and M are both greater than 1.

In these embodiments, the antenna element 37 that is selected for circular polarization may be an inner antenna element, or an antenna element disposed along the edge of the array.

Further, if N (and M for non-square arrays) is less than 4, the upper antenna selection switch 450 and lower antenna selection switch 460 may be used unchanged by leaving some of the demultiplexed signals unused. If N is greater than 4, the upper antenna selection switch 450 and lower antenna selection switch 460 may be modified to include more than 16 demultiplexed signals.

Alternatively, additional antenna selection switches may be added. For example, the signals used by the antenna elements may be routed to 4 antenna selection switches, where the bank selector switch 410 is converted to a 4-to-1 switch.

For example, for a 6×6 array, 4 antenna selection switches may be used where the first two antenna selection switches may be configured as shown in the figures, and the two new antenna selection switches are used to communicate with the additional antenna elements. The multiplexed outputs from the two new antenna selection switches would be the additional demultiplexed signals on the 4-to-1 bank selector switch 410. The 4-to-1 bank selector switch 410 may also have an additional control signal to enable it to select among four demultiplexed signals.

Figure 6:
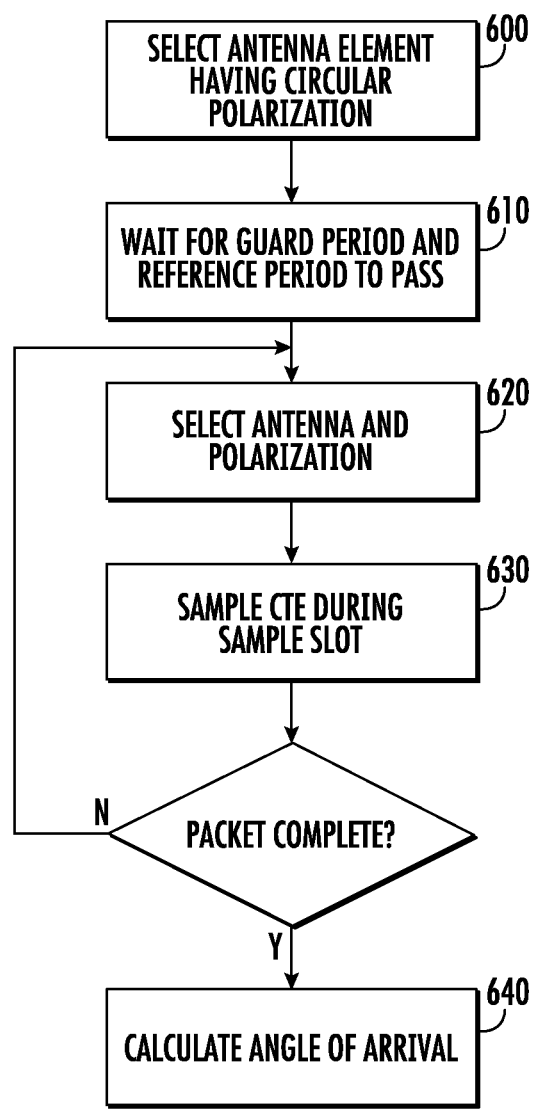
FIG. 6 shows a flowchart describing the operation of the network device.

Based on this switching network 50, a sequence may be defined for the receipt of a CTE. FIG. 6 shows one such sequence. First, as shown in Box 600, the processing unit 20 may configure the switching network 50 so that an antenna element that supports circular polarization is selected. In FIG. 4, this may be antenna #6 or antenna #14. This selection may be made using the values shown in FIG. 5. This antenna element is used to receive at least a portion of the guard period 341 and the reference period 342. Note that during these periods, the gain, which is used by LNA 51 and PGA 54, is set based on the amplitude of the circular polarized signal that is received.

The processing unit 20 waits for the reference period 342 to end as shown in Box 610. Once the reference period 342 has ended, the processing unit 20 then cycles through each of the antenna elements 37 in the antenna array 38 samples both the horizontal and vertical polarized signals from each antenna element 37. First, as shown in Box 620, the processing unit 20 selects a particular antenna element 37 and a polarization. Next, as shown in Box 630, the device samples the polarized signal during the sample slot 344. During the next switch slot 343, the processing unit 20 selects another antenna element 37 and/or polarization and repeats Boxes 620-630 until the packet is complete. At that time, the device has gathered all of the required data and may calculate the angle of arrival, as shown in Box 640.

Note that the order of the antenna elements 37 and polarizations is not limited by this disclosure. For example, in one embodiment, the processing unit may sample the same polarization of each antenna element 37 and then sample each antenna element using the other polarization. In another embodiment, the processing unit 20 may select an antenna element 37, and sample the vertical polarized signal and the horizontal polarized signal sequentially and then switch to the next antenna element 37 and repeat this process. In other words, the antenna switching pattern is not limited by the switching network 50.

Note that FIG. 6 shows the sequence used to receive a CTE 340 and calculate the angle of arrival. The sequence to transmit a CTE in order to allow the calculation of an angle of departure calculation is the same. In this embodiment, an antenna element with a circular polarization is used during the guard period 341 and the reference period 342. The processing unit 20 then switches between antenna elements 37 and/or polarization orientations according to a predetermined switching pattern.

The angle of arrival or departure may be used for many functions. For example, one angle of arrival locator can be used to locate a beacon. This class of applications may be referred to as wayfinding. For example, the beacon may be a set of car keys or another device that a user needs to find. A user, holding the locator device, may be led to the beacon based on the angle of arrival detected by the locator device. As an example, an automobile may be equipped with Bluetooth. A command may be sent by the owner to the automobile disposed in a parking lot to transmit a beacon or sequence of beacons. The locator device, which is carried by the owner, detects the angle of arrival and can lead the owner toward the automobile in the parking lot. In another embodiments, a shopping mall may install beacons at certain locations, such as near exits, certain stores, or the food court. The shopper may use these beacons to guide their way through the mall using a portable locator device. Similarly, the angle of arrival can be used to guide an operator toward an asset in a warehouse or other structure. The locator device may include an indicator that allows the operator to determine the angle of arrival. For example, the locator device may have a visual display that indicates the direction of the beacon. Alternatively, the locator device may have an audio output that informs the user of the direction of the beacon.

When multiple locators are used, the exact location of the transmitter can be determined. This class of applications is referred to as spatial positioning. For example, inside a structure that has multiple locator devices, the exact location of any transmitter may be determined. This may serve to replace GPS in these environments, as GPS positioning requires more power to execute. In one example, an operator may carry a mobile telephone. A plurality of locator devices each determine the angle of arrival for a beacon transmitted by this phone. In one embodiment, these angles of arrival are forwarded to the mobile phone. In another embodiment, these angles of arrival are forwarded to a centralized computational device, which calculates the position of the mobile phone based on all of the received angles of arrival. Thus, the angle of arrival from each locator device may be used by the mobile phone or another device to pinpoint the specific location of the mobile phone. If a plurality of locator devices are employed, three dimensional spatial positioning may also be possible.

Similar functions can be performed using an angle of departure algorithm. For example, the user may have a device that has a single antenna, rather than an antenna array. If the beacons, such as those described above in the shopping mall or warehouse, utilize an antenna array, the user's device may determine the angle of departure.

The device may also be able to determine the angle of departure from multiple beacons. If the position of the beacons is known, the device may be able to calculate its spatial position from these angles of departure.

In other words, this information can be used in the same manner as angle of arrival information for wayfinding and spatial positioning. Furthermore, the device may have an indicator to provide an indication of the angle of departure to the user. In other embodiments, the device may have an indicator to inform the user of its spatial position.

The present system and method has many advantages. First, it has been found that sampling both vertical and horizontal polarized signals during an AoA calculation improves the accuracy of the calculation, especially in multipath situations.

Additionally, it has been found that utilizing a signal having only one polarization (either horizontal or vertical) during the reference period may result in a weaker signal that yields an incorrect gain value.

The present system and method overcomes these shortcomings by providing a switching network that allows the device to separately sample the horizontal and vertical polarized signals for each antenna element in the antenna array. In addition, the switching network allows the device to sample the circular polarized signal from at least one antenna element in the antenna array. Thus, unlike other implementations, an additional antenna element is not needed to provide the circular polarized signal.

This switching circuit minimizes cost, and space while providing this enhanced functionality.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wireless network device, comprising:
   an antenna array, comprising a plurality of antenna elements, each having a vertical polarized signal and a horizontal polarized signal;
   a wireless network interface, wherein the wireless network interface receives an incoming signal from one of the antenna elements in the antenna array;
   a processing unit; and
   a switching network disposed in an electrical path between the antenna array and the wireless network interface to select an antenna element from the antenna array, wherein the switching network comprises one or more selection switches that act as multiplexers and demultiplexers, depending on a direction of activity, the one or more selection switches in communication with the vertical polarized signal and the horizontal polarized signal from each of the plurality of antenna elements and configured to couple the horizontal polarized signal or the vertical polarized signal from any of the plurality of antenna elements to the wireless network interface and is also configured to couple at least one circular polarized signal to the wireless network interface, wherein each circular polarized signal is created by combining the vertical polarized signal and the horizontal polarized signal from a single antenna element.

2. The wireless network device of claim 1, wherein the wireless network device receives a signal comprising a constant tone extension (CTE) with a plurality of switching slots and sample slots.

3. The wireless network device of claim 2, wherein the processing unit comprises a plurality of output signals in communication with the switching network; and wherein the processing unit selects one of the plurality of antenna elements during each switching slot by modifying the plurality of output signals.

4. The wireless network device of claim 3, wherein the CTE further comprises a guard period and a reference period, and wherein the processing unit modifies the plurality of output signals so as to receive the circular polarized signal during at least a portion of the guard period and/or the reference period.

5. The wireless network device of claim 4, wherein the wireless network interface comprises a programmable gain amplifier (PGA) and the processing unit sets a gain of the PGA based on an amplitude of the circular polarized signal received during the at least a portion of the guard period and/or the reference period.

6. The wireless network device of claim 4, wherein the wireless network interface comprises a low noise amplifier (LNA) and the processing unit sets a gain of the LNA based on an amplitude of the circular polarized signal received during the reference period.

7. The wireless network device of claim 1, wherein the antenna array comprises a N×M array wherein N and M are greater than one, and an antenna element disposed along an outer edge of the N×M array is used to provide the circular polarized signal.

8. The wireless network device of claim 1, wherein the antenna array comprises a N×M array wherein N and M are greater than one, and an inner antenna element is used to provide the circular polarized signal.

9. A switching network in communication with an antenna array, wherein each antenna element in the antenna array comprises a horizontal polarized signal and a vertical polarized signal, comprising:
an upper antenna selection switch and a lower antenna selection switch, each having a multiplexed signal and a plurality of demultiplexed signals, wherein the horizontal polarized signal and the vertical polarized signal of each antenna element is in communication with a demultiplexed signal on one of the upper and the lower antenna selection switches; and
wherein the vertical polarized signal and the horizontal polarized signal of at least one antenna element are in communication with demultiplexed signals on different antenna selection switches, wherein control signals, referred to as ANTENNA SELECT, are used to select one of the demultiplexed signals to be in communication with the multiplexed signal;
an upper polarization switch having a multiplexed signal in communication with the multiplexed signal from the upper antenna selection switch, and having a first and a second demultiplexed signal, wherein a control signal, referred to as CIRCULAR, is used to select one of the demultiplexed signals to be in communication with the multiplexed signal;
a lower polarization switch having a multiplexed signal in communication with the multiplexed signal from the lower antenna selection switch, and having a first and a second demultiplexed signal, wherein a control signal, referred to as CIRCULAR, is used to select one of the demultiplexed signals to be in communication with the multiplexed signal;
a 90° hybrid in communication with the second demultiplexed signal from the upper polarization switch and the second demultiplexed signal from the lower polarization switch;
a bank s switch having a multiplexed signal, a first demultiplexed signal in communication with the first demultiplexed signal from the upper polarization switch, and a second demultiplexed signal in communication with the first demultiplexed signal from the lower polarization switch, wherein a control signal, referred to as UPPER/LOWER, is used to select one of the demultiplexed signals to be in communication with the multiplexed signal; and
a main polarization switch having a multiplexed signal, a first demultiplexed signal in communication with the multiplexed signal from the bank selection switch and a second demultiplexed signal in communication with the 90° hybrid, wherein a control signal, referred to as CIRCULAR, is used to select one of the demultiplexed signals to be in communication with the multiplexed signal.

10. The switching network of claim 9, wherein the vertical polarized signal and the horizontal polarized signal f least at two antenna elements are in communication with demultiplexed signals on different antenna selection switches.

11. The switching network of claim 9, wherein the upper antenna selection switch and the lower antenna selection switch each comprise 16 demultiplexed signals, and wherein the antenna array comprises 16 antenna elements.

12. The switching network of claim 9, further comprising a third antenna selection switch and fourth antenna selection switch; and wherein the bank selection switch comprises:
a third demultiplexed signal in communication with a multiplexed signal from the third antenna selection switch;
a fourth demultiplexed signal in communication with a multiplexed signal from the fourth antenna selection switch; and
an additional control signal to select among the four demultiplexed signals.

13. The switching network of claim 9, wherein the antenna array comprises a N×M array wherein N and M are greater than one, and wherein one of the at least one antenna elements is an inner antenna element.

14. The switching network of claim 9, wherein the antenna array comprises a N×M array wherein N and M are greater than one, and wherein one of the at least one antenna elements is disposed along an outer edge of the antenna array.

15. The switching network of claim 9, wherein the switching network is adapted to transmit t signals to the antenna array or receive signals from the antenna array.

16. A method of calculating an angle of arrival comprising:
receiving, at a wireless network device, a signal comprising a constant tone extension, having a guard period, a reference period, and a plurality of switching slots and sample slots, wherein the wireless network device comprises an antenna array comprising a plurality of antenna elements and a switching network to select among signals from the antenna array;
configuring the switching network so as to receive a circular polarized signal from one of the plurality of antenna elements;
receiving the circular polarized signal during at least a portion of the guard period and/or reference period;

configuring the switching network so as to receive a horizontal polarized signal from a first of the plurality of antenna elements during a switching slot;
receiving the horizontal polarized signal from the first of the plurality of antenna elements during sample slot;
configuring the switching network so as to receive a vertical polarized signal from the first of the plurality of antenna elements during a switching slot;
receiving the vertical polarized signal from the first of the plurality of antenna elements during a sample slot;
repeating the configuring and receiving so as to receive vertical polarized signals and horizontal polarized signals from all of the antenna elements in the antenna array;
using information from the horizontal polarized signals and the vertical polarized signals to calculate an angle of arrival.

17. The method of claim 16, further comprising using information from the circular polarized signal to set a gain of a programmable gain amplifier (PGA).

18. The method of claim 16, further comprising using information from the circular polarized signal to set a gain of a low noise amplifier (LNA).

19. The method of claim 16, wherein the antenna array comprises a N×M array wherein N and M are greater than one, and the circular polarized signal is received from an inner antenna element.

20. The method of claim 16, wherein the antenna array comprises a N×M array wherein N and M are greater than one, and the circular polarized signal is received from an antenna element disposed along an outer edge of the antenna array.

* * * * *